United States Patent [19]
Wattron et al.

[11] Patent Number: 5,094,063
[45] Date of Patent: Mar. 10, 1992

[54] MOWER INCLUDING A GROUP OF WORKING ELEMENTS EXTENDING CROSSWISE TO A DIRECTION OF ADVANCE AT WORK

[75] Inventors: Bernard Wattron, Saverne; Roland Helfer, Lampertheim, both of France

[73] Assignee: Kuhn, S.A., Saverne Cedex, France

[21] Appl. No.: 617,791

[22] Filed: Nov. 26, 1990

[30] Foreign Application Priority Data

Nov. 24, 1989 [FR] France ................... 89 15685

[51] Int. Cl.$^5$ ................ A01D 34/66; A01D 34/82
[52] U.S. Cl. ........................... 56/6; 56/13.6; 56/14.9; 56/DIG. 14
[58] Field of Search .............. 56/1, 6, 192, 14.7, 56/14.9, 255, 295, DIG. 1, DIG. 14, 13.6

[56] References Cited

U.S. PATENT DOCUMENTS

| 4,771,591 | 9/1988 | Ermacora | 56/13.6 |
| 4,860,527 | 8/1989 | Maarten | 56/13.6 |

FOREIGN PATENT DOCUMENTS

| 0163587 | 12/1985 | European Pat. Off. . |
| 0184533 | 6/1986 | European Pat. Off. . |
| 0238159 | 9/1987 | European Pat. Off. . |
| 0245186 | 11/1987 | European Pat. Off. . |
| 0297012 | 12/1988 | European Pat. Off. . |
| 0322327 | 6/1989 | European Pat. Off. . |
| 2851611 | 6/1980 | Fed. Rep. of Germany . |
| 2608362 | 6/1988 | France . |
| 1143936 | 7/1971 | United Kingdom . |

*Primary Examiner*—Terry Lee Melius
*Attorney, Agent, or Firm*—Oblon, Spivak, McClelland, Maier & Neustadt

[57] ABSTRACT

A mower to be moved by a motorized vehicle includes a frame supporting a number of working elements (cutting elements combined or not with processing elements). These working elements are arranged crosswise to a direction of advancement of the motor vehicle and mower during work. Two cutting bar parts, one on each side of a central plane of the mower, carry the cutting elements and their associated drive structure. The two cutting bar parts are connected to one another rigidly and reliably. An arrangement of transmission shafts, bevel gears, and universal joints is provided for transferring rotating motion from a power source to the working elements of the mower.

44 Claims, 4 Drawing Sheets

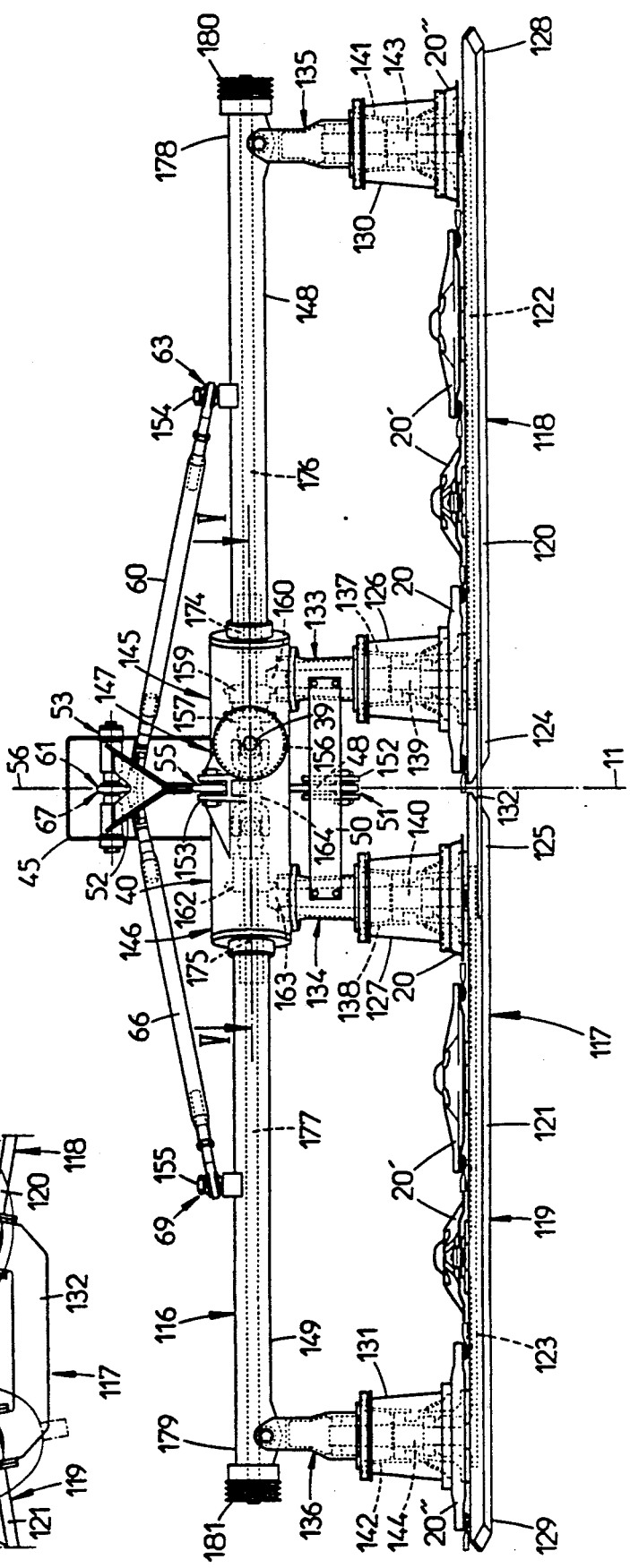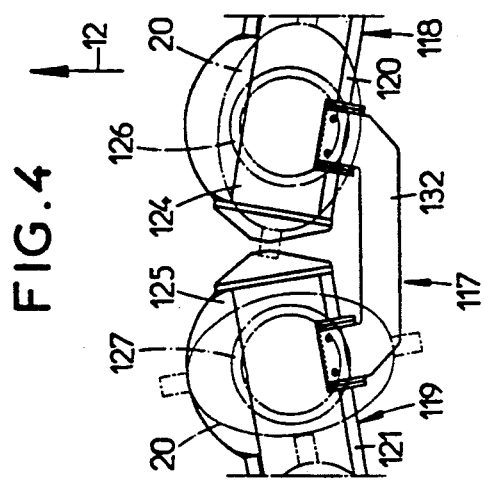

MOWER INCLUDING A GROUP OF WORKING ELEMENTS EXTENDING CROSSWISE TO A DIRECTION OF ADVANCE AT WORK

BACKGROUND OF THE INVENTION

1. Field of the Invention

This invention relates to a mower adapted to be moved by a motor vehicle and powered by a power source. More specifically, the invention relates to a mower of the type having a group of working elements extending, during work, crosswise to a direction of travel of the motor vehicle (the direction of advance at work).

2. Description of the Prior Art

A pulled mower comprising a frame which extends crosswise to the direction of advance at work is known in the prior art. At each of its ends, this frame is equipped with a wheel; by these wheels, it rests and rolls on the ground. It is provided to equip this frame, in its median part, with a tongue which makes it possible to connect the mower to a tractor.

The frame supports a group of working elements which comprises two mowing and conditioning mechanisms. As viewed from the top, the two mowing and conditioning mechanisms form between one another an obtuse angle, open toward the rear. Each mowing and conditioning mechanism comprises a cutting bar section equipped with cutting elements, and a carrying structure to which the cutting bar section is connected. The latter comprises, at each of its ends, a rotor rotating around an axis directed upward. The carrying structure comprises two carrying elements which support the cutting bar section by going through the upper part of the corresponding rotors. Each mowing and conditioning mechanism also comprises a hydraulic motor extending above its end which is adjacent to the other mowing and conditioning mechanism. The two hydraulic motors are coupled to one another by a universal joint telescopic shaft, so that the movement of rotation of the cutting elements of one of the mowing and conditioning mechanisms is synchronous with the movement of rotation of the cutting elements of the other mowing and conditioning mechanism.

The two mowing and conditioning mechanisms are connected to one another, on the one hand, by a coupling ball joint extending, at least partly, under the cutting plane of the cutting elements and, on the other hand, by a common carrying structure. This common carrying structure consists of a beam extending higher than the mowing and conditioning mechanisms. Each mowing and conditioning mechanism is connected to a corresponding end of the beam by a guide yoke which makes it possible for the mowing and conditioning mechanism, on the one hand, to pivot around an axis extending approximately in the direction of advance at work and, on the other hand, to be displaced crosswise to said direction of advance at work.

The group of working elements, thus formed, comprises yokes used in the hooking of connecting rods forming a deformable parallelogram and by which said group of working elements is suspended from the frame.

The carrying structure of the group of working elements of this known mower is, because the two mowing and conditioning mechanisms have a certain number of degrees of freedom relative to one another, relatively complex and, consequently, relatively costly. Further, the many connections reduce the degree of reliability of the mower, because some of them can assume an intolerable play after a certain working period, while others can jam. Finally, the drive means of the group of working elements are no longer satisfactory.

SUMMARY OF THE INVENTION

Accordingly, this invention has as its object to create a novel mower having a rigid group of working elements able to be connected easily to a structure used in particular to displace it, during work, and whose drive means are simple and reliable.

For this purpose, the mower according to this invention is characterized by the fact that:

(a) each drive member comprises a bevel gear;

(b) each of two central carrying elements is connected rigidly to a corresponding bevel gear housing; and (c) the two central carrying elements are directly and/or indirectly connected rigidly to one another.

Thanks to this arrangement, the connection between the two cutting bar parts is very rigid and reliable. The drive means is also relatively simple and reliable.

According to an additional characteristic, it can be provided that the two cutting bar parts are, at their adjacent ends, each surmounted by a rotor rotating around an axis directed upward. These two axes of rotation are, moreover, at least approximately parallel.

It can also be provided, according to another additional characteristic, that one of the central carrying elements penetrates the corresponding rotor of one of the cutting bar parts by passing through an upper part thereof and that the other central carrying element penetrates the corresponding rotor of the other cutting bar part by also passing through an upper part thereof.

It can also be advantageously provided that each central carrying element is connected in a removable manner to the corresponding bevel gear housing.

According to another additional characteristic, it can also be provided that the two cutting bar parts are, in addition, directly coupled to one another by a coupling element extending, at least partly, under the cutting plane of the cutting elements. The rigidity of the connection between the two cutting bar parts is therefore reinforced by the coupling element.

This reinforcement can, moreover, also be improved by providing that the coupling element couples the two cutting bar parts rigidly to one another.

A direct connection between the two central carrying elements can be made by a crossbeam.

An indirect connection between the two central carrying elements can be made at the level of the two bevel gear housings which can be connected rigidly to one another. This rigid connection between the bevel gear housings can, of course, be made, in addition, to the direct connection between the two central carrying elements.

Advantageously, the crossbeam and/or the bevel gear housings, connected rigidly to one another, will be equipped with connecting means making possible the hooking of the group of working elements to the structure used in particular during work to displace the group of working elements. This arrangement is very advantageous because the group of working elements will be hooked to the structure at the level of a very rigid zone.

In a preferred embodiment, each central carrying element comprises in particular a barrel, while the drive elements of the corresponding cutting bar part comprise a drive shaft rotating around an axis directed upward and driven in rotation by the corresponding bevel gear. This drive shaft is guided in rotation in said barrel and, moreover, connected in translation to the latter, so that the cutting bar part is connected to the barrel by the drive shaft.

This barrel, moreover, will be advantageously connected in a removable manner to the housing of the corresponding bevel gear.

When the two barrels are directly connected to one another by a crossbeam, the latter will be advantageously provided above the two corresponding rotors.

According to an additional characteristic of the invention, each bevel gear housing comprises an input shaft extending in an at least approximately horizontal plane and the two input shafts are at least approximately directed toward one another. In addition, it is provided that the drive means comprise a distribution bevel gear housing extending at least partially between the two bevel gear housings and transmitting the movement to the input shafts.

When it is provided that the two bevel gear housings are connected rigidly to one another, this rigid connection can be advantageously made by the distribution bevel gear housing.

Preferably, moreover, the bevel gear housings and the distribution bevel gear housing form a single input housing made in a single piece, which imparts to this unit a remarkable rigidity.

According to an additional characteristic of the invention, it is provided that the input shaft of the distribution bevel gear housing is directed, relative to the direction of advance at work, toward the rear.

According to an additional characteristic of the invention, it can further be provided that the structure, to which is connected the group of working elements, comprises a frame and a suspension device intended to connect the group of working elements to the frame so that the group of working elements can be displaced, in particular in height, relative to the frame.

According to another additional characteristic, it can also be provided that the structure, to which is connected the group of working elements, comprises a frame supported by wheels on the ground, and a tongue connected to said frame by a pivot connection with an axis directed upward.

This pivot connection can be advantageously located at least approximately in the median part of the frame being considered crosswise to the direction of advance at work.

The pivot connection can, moreover, be made by a hub provided at the rear end of the tongue which can be guided in rotation in a bearing integral with the frame.

According to an additional characteristic, transmission means include in particular an intermediate housing comprising a part connected to the tongue whose output shaft has an axis of rotation at least approximately merged with the axis of the pivot connection connecting the tongue to the frame.

This intermediate housing can comprise another part connected to the frame, and it will be provided that the two parts can rotate relative to one another around the axis of the pivot connection connecting the tongue to the frame.

In this case, the second part of the intermediate housing can comprise an input shaft whose axis of rotation will also be at least approximately merged with the axis of the pivot connection, and it can advantageously be provided that the output shaft of the first part and the input shaft of the second part are coupled to one another by a coupling.

Possible defects in positioning of the first part relative to the second part can thus be allowed without introducing harmful stresses in the transmission means.

Preferably, this coupling will consist of a universal joint.

It is also preferable that the first part connected to the tongue extends above the second part connected to the frame.

According to an additional characteristic, the transmission means comprise, in addition, a universal joint telescopic transmission shaft transmitting the movement from the output shaft of the second part of the intermediate housing to the input shaft of the distribution bevel gear housing.

With these characteristics, the tongue can easily occupy several work positions and the group of working elements can be displaced relative to the frame without the transmission means undergoing additional stresses.

According to an additional characteristic, the universal joint telescopic transmission shaft extends, as viewed from the top, at least approximately in the direction of advance at work.

In one embodiment, it is provided that the output shaft of the second part of the intermediate housing extends, taking into account the direction of advance at work, behind the input shaft of the distribution bevel gear housing.

It can also be advantageously provided that the output shaft of the second part of the intermediate housing and the input shaft of the distribution bevel gear housing are at least approximately parallel to the direction of advance at work.

In normal work, moreover, it can also be advantageously provided that the input shaft of the distribution bevel gear housing and the output shaft of the second part of the intermediate housing extend at least approximately at the same height relative to the ground.

According to an additional characteristic of the invention, the two cutting bar parts form between one another, as viewed from the top, an obtuse angle less than 180° and open toward the rear. Thanks to this arrangement, it is possible to make in the track of the mower a single windrow of cut product with a smaller width than the cutting width even though the group of working elements comprises two cutting bar parts.

In this case in particular, it can be advantageously provided that the distribution bevel gear housing comprises a bevel gear transmitting the movement directly to the input shaft of one of the bevel gear housings and that the input shafts of the two bevel gear housings are coupled by a coupling.

In an advantageous embodiment, the coupling comprises two universal joints extending at least approximately symmetrically on both sides of a vertical plane directed in the direction of advance at work and passing through the vertex of the obtuse angle formed by the two input shafts, i.e. the two cutting bar parts.

According to an additional characteristic, it can be provided that the carrying structure comprises, in addition, for each cutting bar part, on the one hand, an outside carrying element connected to the corresponding cutting bar part in the vicinity of the outside end of the latter and, on the other hand, a carrying pipe connected rigidly at one of its ends to the corresponding bevel gear housing and, near the other of its ends, to said outside carrying element.

Advantageously, each cutting bar part, at its outside end, is surmounted by a rotor also rotating around an axis directed upward. This axis of rotation is, moreover, at least approximately parallel to the axis of rotation of the rotor provided at the other end of the corresponding cutting bar part.

In this case, it will preferably be provided that each outside carrying element penetrates the corresponding outside rotor by passing through an upper part thereof.

In a preferred embodiment, it will also be provided that each outside carrying element comprises in particular a barrel, while the drive elements of the corresponding cutting bar part comprise a shaft rotating around an axis directed upward, for the purpose, in particular, of the driving in rotation of the corresponding outside rotor. The shaft is guided in rotation in the barrel and, moreover, connected in translation to the barrel, so that the cutting bar part is connected to the barrel by the shaft.

Advantageously, it will also be provided that at least one of the support pipes is equipped with connecting means making possible the hooking of the group of working elements in the structure used in particular during work, to displace the group of working elements.

According to an additional characteristic, it can also be provided that the bevel gear housing of at least one cutting bar part comprises an output shaft and that inside the corresponding carrying pipe, is guided in rotation a transmission shaft, coupled at its end close to the bevel gear housing to the output shaft of the bevel gear housing and going out at its other end from the outside end of the carrying pipe.

If the group of working elements comprises, in addition, behind the cutting elements, processing elements of the product cut by the cutting elements, said processing elements will then be driven by said transmission shaft.

In a particularly advantageous embodiment, it can be provided that one part of the processing elements is combined with each cutting bar part. In each carrying pipe, there will then also be provided a transmission shaft intended to drive the corresponding part of the processing elements.

In this case, it will further also be advantageously provided that the transmission shaft connecting the output shaft of the second part of the intermediate housing to the input shaft of the distribution bevel gear housing extends between the two parts of the processing elements of the product cut by the cutting elements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a partial section along plane III defined in FIG. 2, FIG. 4 shows a top view of the coupling element connecting the two cutting bar parts directly between one another.

DETAILED DESCRIPTION OF THE PREFERRED EMBODIMENTS

Figure 1:
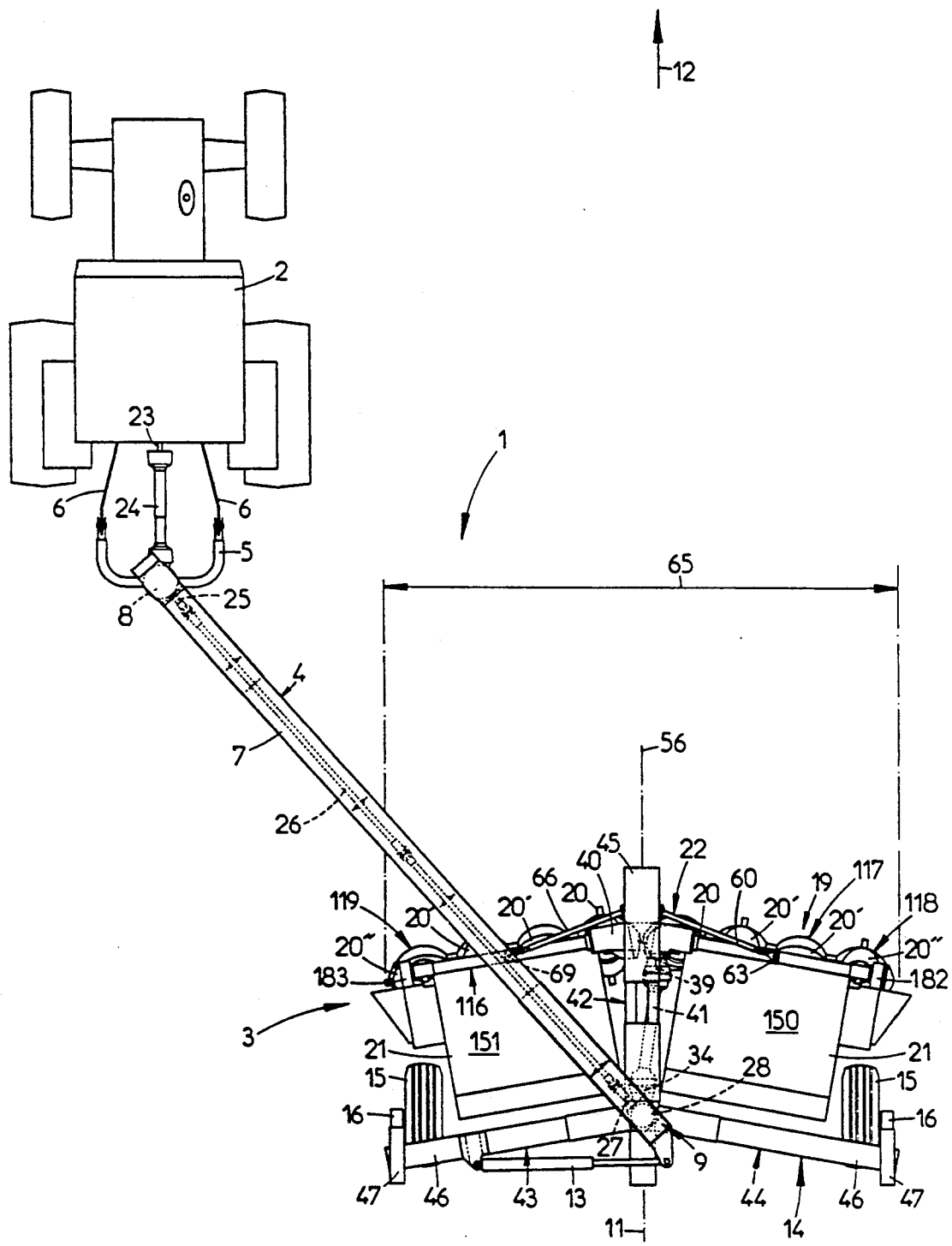
FIG. 1 shows a top view of a mower according to the invention hitched to a farm tractor.

Referring now to the drawings, wherein like reference numerals designate identical or corresponding parts throughout the several views, and more particularly to FIG. 1 thereof, a mower (1) according to the invention is shown hitched to a farm tractor (2).

The mower includes a body (3) and a tongue (4). Tongue (4) has a primary tongue (5) intended to be hitched to lower arms (6) of the rear hitching of farm tractor (2) and a secondary tongue (7) connected to body (3) of mower (1). Primary tongue (5) is connected to the front end of secondary tongue (7) by a connecting device (8) known to one skilled in the art which allows in particular a pivoting of primary tongue (5) relative to secondary tongue (7) around an at least approximately vertical axis. Near its rear end, secondary tongue (7) is connected to body (3) by a pivot connection (9) with a geometric axis (10) (FIG. 2) which is at least approximately vertical and extends at least approximately in median vertical plane (11) of body (3), the median vertical plane (11) being oriented in a direction of advance (12) at work. The angular position of tongue (4) relative to body (3) can be modified by making tongue (4) pivot around axis (10) of pivot connection (9). Positioning tongue (4) in a desired angular position and maintaining it in such a position is achieved by a hydraulic cylinder (13). Thanks to this arrangement, body (3) of mower (1) can, during work, be extended (as seen from the rear of mower (1) in the direction of advance (12) at work) either to the right or to the left of farm tractor (2). This allows back and forth mowing.

Body (3) of mower (1) comprises a frame (14) which rests on the ground, in particular during work, by two wheels (15) which each extend near a respective outside end of frame (14). Each wheel (15) is connected to frame (14) by a wheel arm (16). Each wheel arm (16) is connected to said frame (14) by a pivot connection (17) having an at least approximately horizontal geometric axis oriented at least approximately perpendicular to the direction of advance (12) at work. The geometric axes of pivot connections (17) of two wheel arms (16) are at least approximately merged (aligned with one another). Between each wheel arm (16) and frame (14) is further provided a hydraulic cylinder (18), which makes it possible to make wheel arm (16) and corresponding wheel (15) pivot relative to frame (14) around the geometric axis of corresponding pivot connection (17). This makes it possible for frame (14) to be brought close to the ground (109) during the mowing phase and to be distanced from ground (109) when the mowing is stopped.

Body (3) of mower (1) further comprises a group of working elements (19) equipped with cutting elements (20, 20', 20'') and with processing elements (21) of the product cut by cutting elements (20, 20', 20''), such as conditioning elements, for example. This group of working elements (19) is connected to frame (14) by a suspension device (22).

Driving the group of working elements (19) is achieved from power takeoff (23) of tractor (2) which drives, by a universal joint telescopic shaft (24), the input shaft (not shown) of connecting device (8) which is also, in a manner known to one skilled in the art, a transmission device of the movement. Output shaft (25) of connecting and transmission device (8) transmits the movement to a transmission shaft (26) which is housed inside secondary tongue (7). Transmission shaft (26) is coupled to input shaft (27) of an intermediate housing (28) which extends at the level of the connection of secondary tongue (7) to frame (14). This intermediate housing (28) (FIG. 2) consists of two parts: an upper part (29) integral with secondary tongue (7) and a lower part (30) integral with frame (14). Upper part (29) supports, on the one hand, input shaft (27) and, on the other hand, an intermediate output shaft (31). These two shafts (27, 31) are coupled by a bevel gear pair (32) housed in upper part (29). Lower part (30) supports, on the one hand, an intermediate input shaft (33) and, on the other hand, an output shaft (34). These two shafts (33, 34) are coupled by a bevel gear pair (35) housed in lower part (30). Further, intermediate output shaft (31) and intermediate input shaft (33) are coupled by a universal joint (36). Finally, these two intermediate shafts (31, 33) are arranged so that their respective axes of rotation are merged with geometric axis (10) of pivot connection (9) by which tongue (4) is connected to frame (14) of body (3).

The pivot connection (9) is made in the following manner. At its rear end, secondary tongue (7) is equipped with a hub (37) centered on geometric axis (10) and extending downward. This hub (37) is guided in rotation in a bearing (38) also centered on geometric axis (10) and integral with frame (14). The guiding in rotation of hub (37) in bearing (38) and the axial connection of said hub (37) and the bearing (38) have not been detailed, because the latter are within the scope of one skilled in the art.

Relative to the direction of advance (12) at work, output shaft (34) of lower part (30) of intermediate housing (28), extends behind an input housing (40) of the group of working elements (19). Output shaft (34) drives input shaft (39) of said input housing (40) by a universal joint telescopic transmission shaft (41). In the top view (FIG. 1), it is seen that output shaft (34) of lower part (30) of intermediate housing (28) and input shaft (39) of input housing (40) are at least approximately parallel to one another and that in the same view, universal joint transmission shaft (41) extends at least approximately parallel to the direction of advance (12) at work. During normal work (FIG. 2), it is provided, moreover, that the input shaft (39) of input housing (40) and output shaft (34) of lower part (30) of intermediate housing (28) extend at least approximately at the same height relative to the ground (109).

In FIG. 1, the shape of frame (14) is also clearly shown. The frame (14) consists essentially of a median element (42) and two lateral elements (43, 44) each extending from one respective side of median element (42). Median element (42) consists mainly of the bearing (38) and of a bracket (45) which extends toward the front at least approximately horizontally and at least approximately in the direction of advance (12) at work. Bracket (45) is advantageously connected rigidly, but nevertheless in a removable manner, to bearing (38). Lateral elements (43, 44) each consist of a beam (46) extending at least approximately horizontally and crosswise to the direction of advance (12) at work. A strut (47), extending downward, is attached to the outside end of each beam (46), i.e. the end distant from bearing (38). Wheel arm (16) of corresponding wheel (15) is connected at the lower end of this strut (47). Each lateral element (43, 44) is also connected rigidly and in a removable manner to bearing (38).

Figure 2:
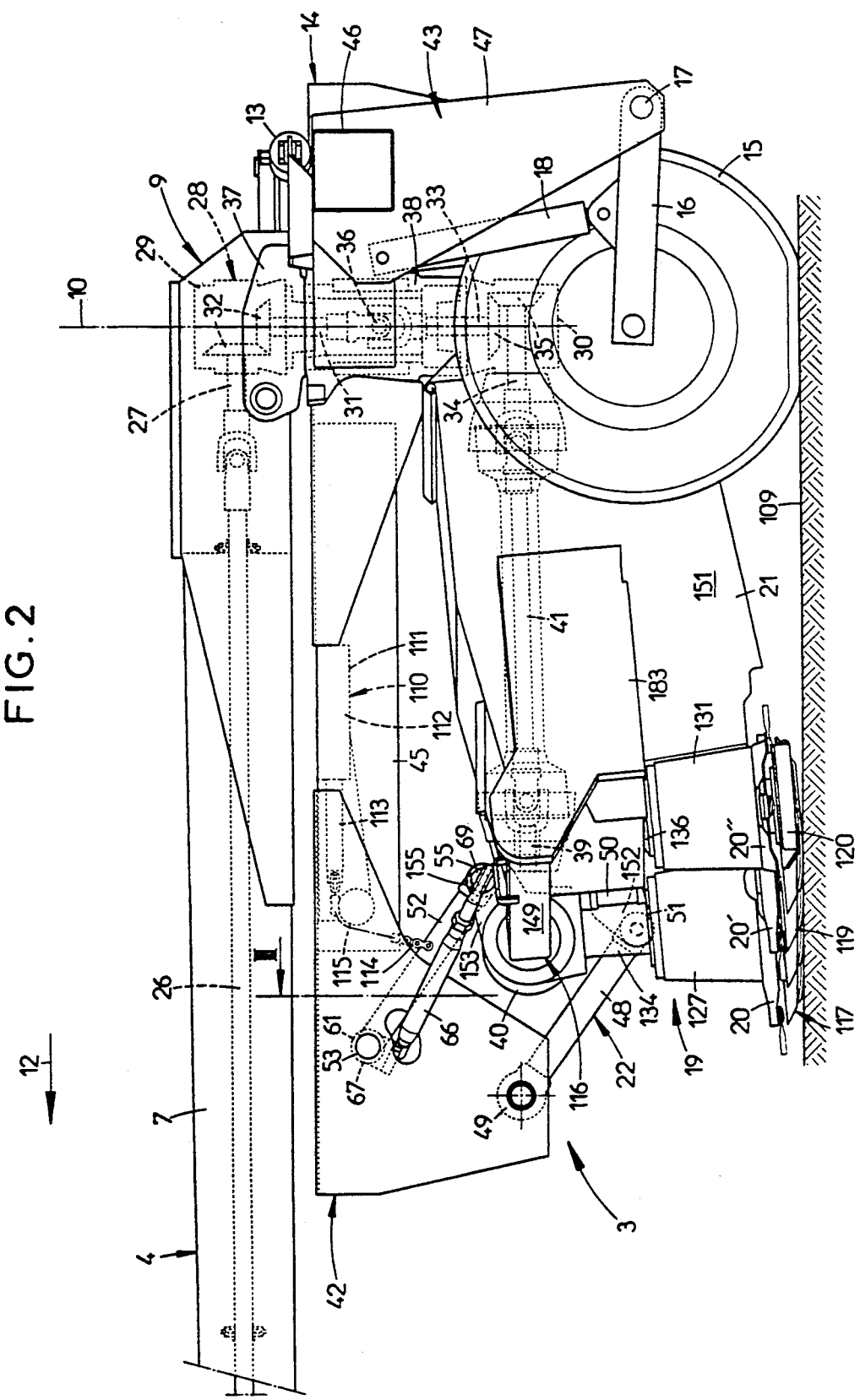
FIG. 2 shows a side view of the body of the mower.

In FIGS. 1 and 2, it is further shown that the group of working elements (19) extends crosswise to the direction of advance (12) at work beneath bracket (45) of median element (42) of frame (14). The group of working elements (19) is connected to a front end of bracket (45) by a suspension device (22). The latter comprises a first suspension element (48) connected, on the one hand, to bracket (45) of frame (14) by a first joint (49) of the ball joint type, and, on the other hand, to a crossbeam (50) of the group of working elements (19) by a second joint (51) also of the ball joint type. As can be seen in FIG. 2 in particular, this second joint (51) extends lower and more to the rear than first joint (49) relative to the direction of advance (12) at work.

Suspension device (22) also comprises a second suspension element (52) connected to bracket (45) of frame (14) by a first joint (53) of the pivot type having a geometric axis which is at least approximately horizontal and directed at least approximately perpendicular to the direction of advance (12) at work. This second suspension element (52) is further connected to input housing (40) of the group of working elements (19) by a second joint (55) of the ball joint type, which extends, as can be seen in FIG. 2, lower and more to the rear than first joint (53) relative to the direction of advance (12) at work. This second suspension element (52) is arranged so that a first plane (56) passing through the center of the second joint (55) and orthogonal to geometric axis of the first joint (53), contains at least approximately the center of first joint (49) of first suspension element (48) and is at least approximately vertical. This second suspension element (52) is further also arranged so that first joint (53) extends higher and more to the rear than first joint (49) of first element (48) relative to the direction of advance (12) at work. Second suspension element (52) thus extends higher than first suspension element (48). This first suspension element (48) is further arranged so that when the group of working elements (19) rests on horizontal ground (109), the center of the second joint (51) extends at least approximately in the first plane (56). Moreover, first joints (49, 53) and second joints (51; 55) of the two suspension elements (48; 52) are arranged so that these two suspension elements (48; 52) form with the frame (14) and the group of working elements (19) at least approximately a deformable parallelogram in particular in first plane (56). Further, since first joints (49; 53) extend more to the front than second joints (51; 55) relative to the direction of advance (12) at work, the deformable parallelogram is drawn, which makes it possible for the group of working elements (19) to pass well above obstacles.

Suspension device (22) also comprises a first lateral suspension element (60) connected to bracket (45) of frame (14) by a first joint (61) of the ball joint type whose center is at least approximately located on geometric axis of first joint (53) of second suspension element (52), as well as being located at least approximately in the first plane (56). The first lateral suspension element (60) is further connected to the group of working elements (19) by a second joint (63) also of the ball joint type.

Second suspension device (22) then also comprises a second lateral suspension element (66) connected to bracket (45) of frame (14) by a first joint (67) of the ball joint type whose center is at least approximately located on geometric axis of first joint (53) of second suspension element (52), as well as being at least approximately in said first plane (56). Preferably, the center of first joint (67) of second lateral suspension element (66) is merged with the center of first joint (61) of first lateral suspension element (60). This second lateral suspension element (66) is further connected to the group of working elements (19) by a second joint (69) also of the ball joint type.

The two lateral suspension elements (60, 66) are arranged so that the centers of their second joints (63, 69), the center of second joint (55) of second suspension element (52) and the merged centers of first joints (61, 67) of two lateral suspension elements (60, 66) are at least approximately located in a second plane which, when the group of working elements (19) rests on horizontal ground (109), is at least approximately orthogonal to said first plane (56).

In FIG. 1, it is further shown that second joint (63) of first lateral suspension element (60) is located, as viewed from the rear of mower (1), approximately in the median part of the part of the group of working elements (19) extending on the same side of median plane (11) as the first lateral suspension element (60). Likewise, it is also shown that second joint (69) of second lateral suspension element (66) is located, as viewed from the rear of mower (1), approximately in the median part of the part of the group of working elements (19) extending on the same side of median plane (11) as the second lateral suspension element (66).

The two suspension elements (48, 52) and the two lateral suspension elements (60, 66), constituting suspension device (22), are each formed by a rigid connecting rod.

As can be seen in FIG. 2, mower (1) also comprises a lifting device (110) of the group of working elements (19). This device consists of a hydraulic cylinder (111) whose cylinder (112) is connected to frame (14) and whose rod (113) is connected to a chain (114). This chain (114) is wound partially on a wheel (115) guided in rotation in frame (14) and is connected at its end distant from hydraulic cylinder (111) to second suspension element (52). During work, this lifting device (110) does not interfere with the displacement of the group of working elements (19) relative to frame (14). When the group of working elements (19) is to be lifted, it will be sufficient to make rod (113) enter into body (112) of hydraulic cylinder (111) by injecting fluid in the latter. By so doing, rod (113) pulls, via chain (114), on second suspension element (52), which has the effect of making the group of working elements (19) rise by deformation of the deformable parallelogram.

As stated above, the group of working elements (19) is equipped with cutting elements (20, 20', 20'') and processing elements (21) of the product cut by cutting elements (20, 20', 20'').

The group of working elements (19) extends, during work, crosswise to the direction of advance (12) at work. It first of all comprises a carrying structure (116) to which is connected a cutting bar (117), made in two parts (118, 119), each equipped with a certain number of the cutting elements (20, 20', 20'').

Each cutting bar part (118, 119) comprises a housing (120, 121) above which corresponding cutting elements (20, 20', 20'') extend. Cutting elements (20, 20', 20'') are, in the example shown, made in the form of rotary cutting elements each rotating around a respective axis directed upward. For this purpose, the cutting elements (20, 20', 20'') are guided in rotation in their corresponding housings (120, 121) which contain a part of drive elements (122, 123) of said rotary cutting elements (20, 20', 20''). This arrangement is known to one skilled in the art and therefore will not be described in more detail. Moreover, the cutting element (20) extending at end (124, 125) of one cutting bar part (118, 119) adjacent to the other cutting bar part (119, 118), is surmounted by a rotor (126, 127) rotating around the same axis as the cutting element (20). Likewise, cutting element (20'') extending at an outside end (128, 129) of one cutting bar part (118, 119), is also surmounted by a rotor (130, 131) rotating around the same axis as said cutting element (20'').

In FIGS. 3 and 4, it is shown, moreover, that the two cutting bar parts (118, 119) are directly coupled to one another by a coupling element (132). This coupling element (132) extends, in top view, essentially behind housings (120, 121) of the two cutting bar parts (118, 119) and is screwed at each of ends (124, 125) of the latter. Moreover, this coupling element (132) extends, in the example shown, under the cutting plane produced by cutting elements (20) arranged at adjacent ends (124, 125) of the two cutting bar parts (118, 119).

As stated above, cutting bar (117) thus formed is connected to carrying structure (116). For this purpose, the carrying structure (116) comprises two central carrying elements (133, 134) and two outside carrying elements (135, 136) so that each cutting bar part (118, 119) is connected at its end (124, 125) close to other cutting bar part (119, 118) to a central carrying element (133, 134) and at its outside end (128, 129) to an outside carrying element (135, 136).

Each central carrying element (133, 134) consists of a barrel (137, 138) which penetrates rotor (126, 127) provided at corresponding end (124, 125) of cutting bar part (118, 119) by going through the upper part of the latter. Drive elements (122, 123) of each cutting bar part (118, 119) comprise a drive shaft (139, 140), which is guided in rotation in corresponding barrel (137, 138) and, moreover, is connected in translation to the latter.

Likewise, each outside carrying element (135, 136) also consists of a barrel (141, 142) which penetrates rotor (130, 131) provided at outside end (128, 129) of corresponding cutting bar part (118, 119), by going through the upper part of the latter. Drive elements (122, 123) of each cutting bar part (118, 119) further comprise a shaft (143, 144) which penetrates rotor (130, 131), in particular for driving in rotation of the latter, as well as cutting element (20'') that it surmounts. This shaft (143, 144) is guided in rotation in barrel (141, 142) and, moreover, is connected in translation to the latter. In this way, each cutting bar part (118, 119) is connected to two corresponding barrels (137, 141 and 138, 142).

In the embodiment shown, it is seen that input housing (40) is also part of carrying structure (116). The input housing (40), made in the form of a rigid single piece, actually consists of two bevel gear housings (145, 146) and a distribution housing (147) which extends between two bevel gear housings (145, 146). A more detailed description of the input housing (40) will be made later. Each bevel gear housing (145, 146) extends above respective end (124, 125) of a cutting bar part (118, 119); and it is provided that barrel (137, 138) of each central carrying element (133, 134) is connected rigidly, but in a removable manner, to corresponding bevel gear housing (145, 146).

The two central carrying elements (133, 134) are thus connected indirectly to one another by input housing (40) which, as stated above, consists of a rigid single piece.

In FIG. 3, it is also clearly shown that two central carrying elements (133, 134) (more precisely the two barrels (137, 138)) are, in addition, connected directly and rigidly to one another by crossbeam (50) which extends above two rotors (126, 127) provided at two adjacent ends (124, 125) of two cutting bar parts (118, 119).

In addition, carrying structure (116) comprises two carrying pipes (148, 149) each extending at a certain distance above cutting elements (20, 20', 20") of corresponding cutting bar part (118, 119). Carrying pipe (148), corresponding to cutting bar part (118), extends between respective bevel gear housing (145) and outside carrying element (135), to which it is connected rigidly but in a removable manner. Likewise, carrying pipe (149), corresponding to cutting bar part (119), extends between respective bevel gear housing (146) and outside carrying element (136), to which it is connected rigidly but in a removable manner.

As stated above, the group of working elements (19) also comprises processing elements (21) of the product cut by cutting elements (20, 20', 20"). These processing elements (21), such as conditioning elements of the product cut by cutting elements (20, 20', 20"), for example, have not been detailed in the figures. In FIG. 1, it is shown, however, that in the example shown, a part (150, 151) of processing elements is combined with each cutting bar part (118, 119).

In FIG. 1, it is also shown that the two cutting bar parts (118, 119) form between one another, in top view, an obtuse angle less than 180° and open toward the rear.

The group of working elements (19), thus formed, also comprises a certain number of connecting means by which it is connected to suspension device (22). Thus:

on crossbeam (50), there is provided a yoke (152) to which is connected the rear end of first suspension element (48), on input housing (40), there is provided a yoke (153) to which is connected the rear end of second suspension element (52), on carrying pipe (148), corresponding to cutting bar part (118), there is provided a pin (154), to which is connected the rear end of first lateral suspension element (60), and on carrying pipe (149), corresponding to cutting bar part (119), there is provided a pin (155), to which is connected the rear end of second lateral suspension element (66).

Figure 5:
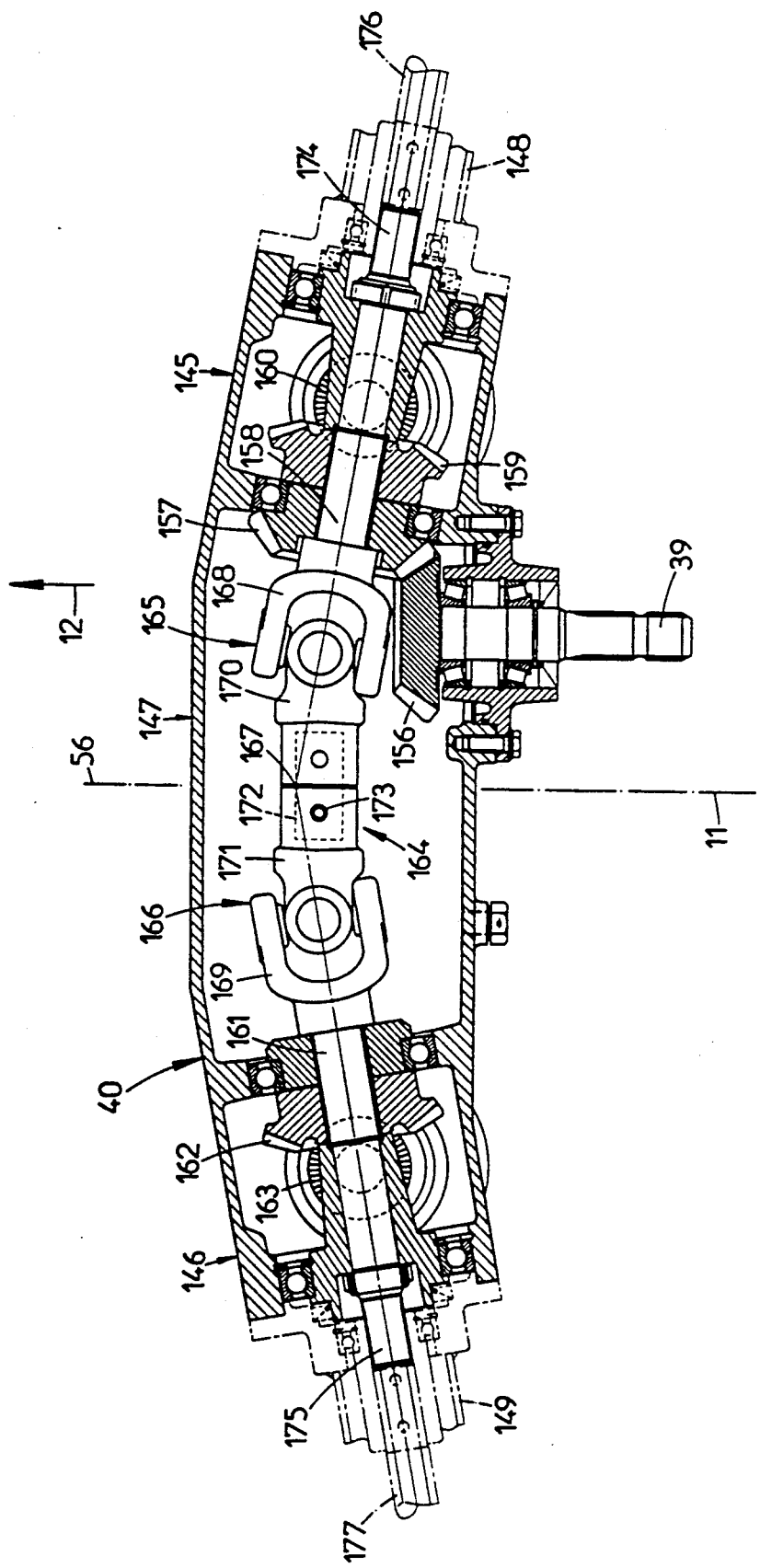
FIG. 5 show a view in section along plane V—V defined in FIG. 3 of the input housing of the group of working elements.

Input housing (40) is shown in FIG. 3, but it is shown in the best detail in FIG. 5. As stated above, this input housing (40) is made in a rigid single piece and consists of two bevel gear housings (145, 146) and a distribution housing (147) which extends between two bevel gear housings (145, 146).

Input shaft (39) of input housing (40) is actually the input shaft of distribution housing (147). Inside distribution housing (147), input shaft (39) is equipped with a first bevel gear (156) which engages with a second bevel gear (157) connected to input shaft (158) of bevel gear housing (145) corresponding to cutting bar part (118). First bevel gear (156) and second bevel gear (157) constitute the distribution bevel gear.

Inside bevel gear housing (145), corresponding to cutting bar part (118), input shaft (158) of this bevel gear housing (145) is equipped with a first bevel gear (159) which engages with a second bevel gear (160) connected to the upper end of drive shaft (139) the drive shaft (139) being part of drive elements (122) of corresponding cutting bar part (118) (FIG. 3). First bevel gear (159) and second bevel gear (160) constitute the bevel gear corresponding to cutting bar part (118), i.e. that which, as seen from the rear of the mower (1), extends to the right of median plane (11). Input shaft (39) of distribution housing (147) and input shaft (158) of bevel gear housing (145) corresponding to cutting bar part (118) are approximately located in a horizontal plane. Moreover, input shaft (39) is oriented rearward and parallel to the direction of advance (12) at work, while input shaft (158) of bevel gear housing (145) is parallel to the direction of corresponding cutting bar part (118). In this way, input shaft (39) and input shaft (158) form between one another an angle whose value is equal to one half of the value of the obtuse angle that the two cutting bar parts (118, 119) form between one another. Input shaft (158) of bevel gear housing (145) and drive shaft (139) corresponding to cutting bar part (118) are orthogonal. Drive shaft (139) extends from bevel gear housing (145) downward and somewhat toward the rear at a value corresponding to the cutting angle of cutting bar part (118).

Bevel gear housing (146), corresponding to cutting bar part (119), i.e., that which extends to the left of median plane (11) as viewed from the rear of mower (1), also comprises an input shaft (161). Inside this bevel gear housing (146), input shaft (161) is equipped with a first bevel gear (162) which engages with a second bevel gear (163) connected to the upper end of drive shaft (140), the drive shaft (140) being part of drive elements (123) of corresponding cutting bar part (119) (FIG. 3). First bevel gear (162) and second bevel gear (163) constitute the bevel gear corresponding to cutting bar part (119). Input shaft (161) of bevel gear housing (146) is also located in the horizontal plane in which input shafts (39 and 158) are located. Moreover, input shaft (161) of bevel gear housing (146) is parallel to the direction of corresponding cutting bar part (119). In this way, input shaft (158) of bevel gear housing (145) and input shaft (161) of bevel gear housing (146) form between one another an angle whose value is equal to the value of the obtuse angle that two cutting bar parts (118, 119) form between one another. Input shaft (161) and drive shaft (140), corresponding to cutting bar part (119), are also orthogonal. The drive shaft (140) further extends from bevel gear housing (146) downward and somewhat toward the rear at a value corresponding to the cutting angle of cutting bar part (119).

The end of input shaft (158) of bevel gear housing (145) and the end of input shaft (161) of bevel gear housing (146), extending inside distribution housing (147), are coupled to one another by a coupling (164) which comprises two universal joints (165, 166) extending at least approximately symmetrically on both sides of a vertical plane directed in the direction of advance (12) at work and passing through vertex (167) of the obtuse angle formed by the two input shafts (158, 161), i.e , of the obtuse angle formed by two cutting bar parts (118, 119). Each universal joint (165, 166) comprises a jaw (168, 169) connected to the respective end of corresponding input shaft (158, 161). Each universal joint (165, 166) comprises, in addition, a second jaw (170, 171). These second jaws (170, 171) are connected to one another by a grooved shaft (172) attached rigidly to one (171) of second jaws (170, 171) by a pin (173).

Each bevel gear housing (145, 146) comprises, in addition, an output shaft (174, 175). In the example shown, output shaft (174, 175) further forms the same piece with corresponding input shaft (158, 161). Each output shaft (174, 175) transmits the movement to a corresponding transmission shaft (176, 177) guided in rotation in respective carrying pipe (148, 149) and, moreover, connected in translation to the latter. Each transmission shaft (176, 177) comes out of corresponding carrying pipe (148, 149) at outside end (178, 179) of the latter and is connected at this location to a transmission element (180, 181). In the example shown, this transmission element (180, 181) consists of a pulley. Each transmission element (180, 181) is used to provide the movement to processing elements (21) of corresponding part (150, 151) of processing elements. In FIG. 1, these transmission elements (180, 181) are not shown since they are housed under a respective hood (182, 183).

Various modifications can be provided to the embodiment described above without thereby going outside the general scope of this invention as defined in the following claims.

Thus, for example, housing (120) of cutting bar part (118) and housing (121) of cutting bar part (119) could be made in a single piece and constitute a single housing. In this case, the median part of the single housing plays the role of coupling element (equivalent to coupling element (132) of the example shown) between two cutting bar parts (118, 119).

Central carrying element (133, 134) and/or outside carrying element (135, 136) could also carry corresponding cutting bar part (118, 119) by not penetrating corresponding rotor (126, 127) and (130, 131), but by passing, taking into account direction of advance (12) at work, behind the latter.

The group of working elements (19) could very well comprise only cutting elements (20, 20', 20").

Furthermore, a single part of processing elements (21) extending both behind cutting bar part (118) and cutting bar part (119) could be provided.

Moreover, mower (1) of the example described is a pulled mower; it will be understood that the invention can, however, apply to other mowers, such as a mower intended to be hitched to the front hitch of a motor vehicle, for example.

Further, cutting elements (20, 20', 20") can be different from the disks equipping the mower shown.

Finally, it can also be provided that the group of working elements (19) is connected directly, without connecting device (22), to the structure intended during the use of the mower, to be hitched to a motor vehicle.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mower comprising:
    a structure adapted, during use of said mower, to be hitched to a motor vehicle; and
    a group of working elements connected to said structure via connecting means and arranged at least substantially crosswise to a direction of advancement of said mower during work, said group of working elements comprising:
    (a) a cutting bar having a first cutting bar part and a second cutting bar part, each of said cutting bar parts being equipped with cutting elements and drive elements, said drive elements extending at least partially under said cutting elements;
    (b) a carrying structure to which said cutting bar is connected, said carrying structure comprising two central carrying elements, a first one of said central carrying elements being connected to said first cutting bar part, and a second one of said central carrying elements being connected to said second cutting bar part; and
    (c) a drive means having two drive members, a first one of said drive members extending above an end of said first cutting bar part adjacent said second cutting bar part, said first drive member being coupled to said drive elements of said first cutting bar part, and a second one of said drive members extending above an end of said second cutting bar part adjacent said first cutting bar part, said second drive member being coupled to said drive elements of said second cutting bar part, said drive means during work receiving power from a driving source via a transmission means;
    wherein:
    each one of said first and second drive members comprises a bevel gear housing containing a bevel gear;
    each one of said first and second central carrying elements is rigidly connected to a corresponding one of said two bevel gear housings; and
    said first and second central carrying elements are connected to one another in a rigid manner.

2. A mower according to claim 1, wherein the two cutting bar parts are, at their adjacent ends, each surmounted by a rotor rotating around an at least approximately vertical axis.

3. A mower according to claim 2, wherein said first central carrying element passes through an upper part of a corresponding rotor of said first cutting bar part, and wherein said second central carrying element passes through an upper part of a corresponding rotor of said second cutting bar part.

4. A mower according to claim 1, wherein each of said central carrying elements is connected in a removable manner to the corresponding bevel gear housing.

5. A mower according to claim 1, wherein the two cutting bar parts are directly coupled to one another by a coupling element extending, at least partly, under a cutting plane formed by the cutting elements.

6. A mower according to claim 5, wherein the coupling element rigidly couples the two cutting bar parts to one another.

7. A mower according to claim 1, wherein the central carrying elements are connected directly to one another by a crossbeam.

8. A mower according to claim 7, wherein some of said connecting means for connecting said group of working elements to said structure adapted to be hitched to a motor vehicle are provided on said crossbeam.

9. A mower according to claim 1, wherein the bevel gear housings are connected rigidly to one another.

10. A mower according to claim 9, wherein some of said connecting means for connecting said group of working elements to said structure adapted to be hitched to a motor vehicle are provided on said bevel gear housings connected rigidly to one another.

11. A mower according to claim 1, wherein each central carrying element comprises in particular a barrel, whereas the drive elements of the corresponding cutting bar part comprise a drive shaft, said drive shaft rotating around an at least approximately vertical axis and being driven in rotation by the corresponding bevel gear, said drive shaft being guided in rotation in said barrel and connected in translation to the barrel so that said cutting bar part is connected to said barrel by said drive shaft.

12. A mower according to claim 11, wherein the two cutting bar parts are, at said respective adjacent ends, each surmounted by a rotor adapted to rotate around an at least approximately vertical axis; wherein said central carrying elements are connected directly to one another by a crossbeam; and wherein said crossbeam rigidly connects the two barrels to one another above the two corresponding rotors.

13. A mower according to claim 1, wherein a first of said bevel gear housings includes a first input shaft and a second of said bevel gear housings includes a second input shaft, said first and second input shafts extending at least approximately toward one another in an at least approximately horizontal plane; and wherein
said drive means further comprising a distribution bevel gear housing extending at least partially between the first and second bevel gear housings, said distribution bevel gear housing transmitting movement from an input shaft of the distribution bevel gear housing to said first and second input shafts.

14. A mower according to claim 13, wherein said first and second bevel gear housings are connected rigidly to one another by said distribution bevel gear housing.

15. A mower according to claim 14, wherein said first and second bevel gear housings and said distribution bevel gear housing form a single input housing made in a single piece.

16. A mower according to claim 13, wherein said input shaft of the distribution bevel gear housing is directed, relative to the direction of advancement of the mower, toward the rear.

17. A mower according to claim 1, wherein said structure adapted to be hitched to a motor vehicle comprises a frame and a suspension device, said suspension device being constructed so as to permit said group of working elements to be displaced, in particular in height, relative to said frame.

18. A mower according to claim 1, wherein said structure adapted to be hitched to a motor vehicle comprises:
a frame supported on the ground by wheels; and
a tongue connected to said frame by a pivot connection having an at least approximately vertical axis.

19. A mower according to claim 18, wherein said pivot connection is placed at least approximately in a median part of said frame considered crosswise to the direction of advancement of the mower.

20. A mower according to claim 18, wherein said pivot connection is made by a hub provided at a rear end of the tongue.

21. A mower according to claim 20, wherein the hub is guided in rotation in a bearing integral with the frame.

22. A mower according to claim 18, wherein the transmission means includes an intermediate housing having a first part connected to said tongue, said first part comprising an output shaft having an axis of rotation at least approximately aligned with the axis of the pivot connection.

23. A mower according to claim 22, wherein said intermediate housing further comprises a second part connected to the frame, said first and second parts of said intermediate housing being able to rotate relative to one another around the axis of the pivot connection.

24. A mower according to claim 23, wherein said second part comprises an input shaft having an axis of rotation at least approximately merged with the axis of the pivot connection, and wherein said output shaft of said first part and said input shaft of said second part are coupled to one another by a coupling.

25. A mower according to claim 24, wherein said coupling includes a universal joint.

26. A mower according to claim 23, wherein said first part connected to said tongue extends above said second part connected to the frame.

27. A mower according to claim 23, wherein said structure adapted to be hitched to a motor vehicle comprises a suspension device mounting said group of working elements on said frame so that said group of working elements can be displaced, in particular in height, relative to said frame; wherein a first of said bevel gear housings includes a first input shaft and a second of said bevel gear housings includes a second input shaft, said first and second input shafts extending at least approximately toward one another in an at least approximately horizontal plane; wherein said drive means comprise, in addition, a distribution bevel gear housing extending at least partially between the first and second bevel gear housings, said distribution gear housing transmitting movement from an input shaft of the distribution bevel gear housing to said first and second input shafts of said first and second bevel gear housings, and wherein said transmission means comprise, in addition, a universal joint telescopic transmission shaft transmitting movement from an output shaft of said second part of the intermediate housing to the input shaft of the distribution bevel gear housing.

28. A mower according to claim 27, wherein as viewed from the top, said universal joint telescopic transmission shaft extends at least approximately in the direction of advancement of the mower at work.

29. A mower according to claim 27, wherein said output shaft of said second part of the intermediate housing extends behind the input shaft of the distribution bevel gear housing relative to the direction of advancement of the mower at work.

30. A mower according to claim 27, wherein said output shaft of said second part of the intermediate housing and input shaft of the distribution bevel gear housing are at least approximately parallel to the direction of advancement of the mower at work.

31. A mower according to claim 27, wherein during normal work, the input shaft of the distribution bevel gear housing and the output shaft of said second part of the intermediate housing extend at least approximately at the same height relative to the ground.

32. A mower according to claim 1, wherein the first and second cutting bar parts form between one another, as viewed from the top, an obtuse angle less than 180° and open toward the rear.

33. A mower according to claim 32, wherein a first of said bevel gear housings comprises a first input shaft and a second of said bevel gear housings includes a second input shaft, said first and second input shafts extending at least approximately toward one another in an at least approximately horizontal plane; wherein said drive means comprise, in addition, a distribution bevel gear housing extending at least partially between the first and second bevel gear housings, said distribution gear housing transmitting movement from an input shaft of the distribution gear housing to said first and second input shafts of said first and second bevel gear housings; wherein said distribution bevel gear housing comprises a bevel gear transmitting movement directly to said first input shaft of said first bevel gear housing, and wherein said first and second input shafts of the first and second bevel gear housings are coupled by a coupling.

34. A mower according to claim 33, wherein the coupling comprises two universal joints extending at least approximately symmetrically on both sides of a vertical plane directed in the direction of advancement of the mower at work, said plane also passing through a vertex of the obtuse angle formed by the two cutting bar parts.

35. A mower according to claim 1, wherein the carrying structure comprises a first outside carrying element connected to said first cutting bar part in the vicinity of an outside end thereof, and a first carrying pipe connected rigidly at one of its ends to a first of said bevel gear housings and connected near the other of its ends to said first outside carrying element; said carrying structure further comprising a second outside carrying element connected to said second cutting bar part in the vicinity of an outside end thereof, and a second carrying pipe connected rigidly at one of its ends to a second of said bevel gear housings and connected near the other of its ends to said second outside carrying element.

36. A mower according to claim 35, wherein said first cutting bar part is, at its outside end, surmounted by a first outside rotor rotating around an at least approximately vertical axis, and wherein said first outside carrying element passes through an upper part of said first outside rotor; and wherein said second cutting bar part is, at its outside end, surmounted by a second outside rotor rotating around an at least approximately vertical axis, and wherein said second outside carrying element passes through an upper part of said second outside rotor.

37. A mower according to claim 35, wherein said first outside carrying element comprises a first outside barrel, whereas the drive elements of said first cutting bar part comprising a first outside shaft rotating around an at least approximately vertical first outside axis, said first outside shaft driving in rotation said first outside rotor, said first outside shaft being guided in rotation in said first outside barrel and, moreover, said first outside shaft being connected in translation to the first outside barrel, so that said first cutting bar part is connected to said first outside barrel by said first outside shaft; and wherein said second outside carrying element comprises a second outside barrel, whereas the drive elements of said second cutting bar part comprising a second outside shaft rotating around an at least approximately vertical second outside axis, said second outside shaft driving in rotation said second outside rotor, said second outside shaft being guided in rotation in said second outside barrel and, moreover, said second outside shaft being connected in translation to the second outside barrel, so that said second cutting bar part is connected to said second outside barrel by said second outside shaft.

38. A mower according to claim 35, wherein some of said connecting means for connecting said group of working elements to said structure adapted to be hitched to a motor vehicle are provided on at least one of said first and second carrying pipes.

39. A mower according to claim 35, wherein said first bevel gear housing comprises a first output shaft, a first transmission shaft is guided in rotation inside said first carrying pipe, said first transmission shaft is coupled, at an end close to said first bevel gear housing, to said first output shaft, and said first transmission shaft comes out at its other end from an outside end of said first carrying pipe; and wherein said second bevel gear housing comprises a second output shaft, a second transmission shaft is guided in rotation inside said second carrying pipe, said second transmission shaft is coupled, at an end close to said second bevel gear housing, to said second output shaft, and said second transmission shaft comes out at its other end from an outside end of said second carrying pipe.

40. A mower according to claim 1, wherein said group of working elements further comprises processing elements for processing the product cut by said cutting elements said processing elements extending behind said cutting elements.

41. A mower according to claim 40, wherein the carrying structure comprises, for each of said first and second cutting bar parts, an outside carrying element connected to the corresponding cutting bar part in the vicinity of an outside end of said cutting bar part, and a carrying pipe connected rigidly at one of its ends to a corresponding one of the bevel gear housings and connected at the other of its ends to said outside carrying element; wherein at least one of the bevel gear housings comprises an output shaft, whereas a transmission shaft is guided in rotation inside the corresponding carrying pipe, the transmission shaft is coupled at an end close to said bevel gear housing to the output shaft, said transmission shaft coming out at an other end from an outside end of said carrying pipe; and wherein said processing elements are driven by said transmission shaft.

42. A mower according to claim 41, wherein in each carrying pipe, a transmission shaft is guided; wherein said processing elements are divided into two parts each combined with a corresponding one of said cutting bar parts; and wherein each part of the processing elements is driven by a corresponding one of the transmission shafts.

43. A mower according to claim 42, wherein said structure adapted to be hitched to a motor vehicle comprises a frame and a suspension device mounting said group of working elements on said frame so that said group of working elements can be displaced, in particular in height, relative to said frame; wherein a first of said bevel gear housings includes a first input shaft and a second of said bevel gear housings includes a second input shaft, said first and second input shafts extending at least approximately toward one another in an at least approximately horizontal plane; wherein said drive means comprise, in addition, a distribution bevel gear housing extending at least partially between the first and second bevel gear housings, said distribution gear housing transmitting movement from an input shaft of the distribution bevel gear housing to said first and second input shafts of said first and second bevel gear housings; wherein said transmission means comprises a universal joint telescopic transmission shaft transmitting movement to the input shaft of the distribution bevel gear housing; and wherein said universal joint telescopic transmission shaft extends between said two parts of said processing elements.

44. A mower according to claim 40, wherein said processing elements are conditioning elements of the products cut by the cutting elements.

* * * * *